United States Patent [19]

Merdem et al.

[11] Patent Number: 5,057,359
[45] Date of Patent: Oct. 15, 1991

[54] CARTON BLANK, ESPECIALLY FOR USE IN CONTAINERS FOR FOOD PRODUCTS

[75] Inventors: Knut Merdem, Fredrikstad; Terje Hansen, Moss, both of Norway

[73] Assignee: Polycoat A/S, Dilling, Norway

[21] Appl. No.: 259,846

[22] Filed: Oct. 19, 1988

[30] Foreign Application Priority Data

Oct. 21, 1987 [NO] Norway .................. 874385

[51] Int. Cl.$^5$ .............. B32B 27/10; B65D 65/40
[52] U.S. Cl. .................. 428/213; 428/219; 428/513; 428/461; 428/518; 428/342; 428/516; 229/3.5 R
[58] Field of Search ........... 428/219, 507, 516, 513, 428/213

[56] References Cited

U.S. PATENT DOCUMENTS

| 3,187,480 | 6/1985 | Feeney et al. ............ 53/29 |
| 3,661,697 | 5/1972 | Kimmel et al. . |
| 4,389,438 | 6/1983 | Ohtsuki et al. ............ 428/461 |

FOREIGN PATENT DOCUMENTS

| 139612 | 4/1985 | European Pat. Off. . |
| 2530477 | 2/1976 | Fed. Rep. of Germany . |
| 63372 | 2/1983 | Finland . |
| 65736 | 3/1984 | Finland . |
| 69098 | 4/1945 | Norway . |
| 139293 | 2/1976 | Norway . |
| 301289 | 5/1968 | Sweden . |
| 1011796 | 12/1965 | United Kingdom . |
| 1549761 | 8/1979 | United Kingdom . |

OTHER PUBLICATIONS

Von K. Becker article.

*Primary Examiner*—P. C. Sluby
*Attorney, Agent, or Firm*—Merchant, Gould, Smith, Edell, Welter & Schmidt

[57] ABSTRACT

A carton, blank, especially for use for containers for food products is composed to provide maximum safety against leakage from the container, and to safeguard against gas passage through the container wall. For this object the carton blank is built up as a laminate of paperboard (1), and paper (2) of the greaseproof kind, an adhesive layer, such as a polyolefine layer (3) being used, and said basic member (1, 2, 3) is on both sides provided with external layers (4, 5) of polyolefine. The adhesive layers (3, 4, 5) may, additionally, have dye pigments added to provide impermeability to light.

12 Claims, 1 Drawing Sheet

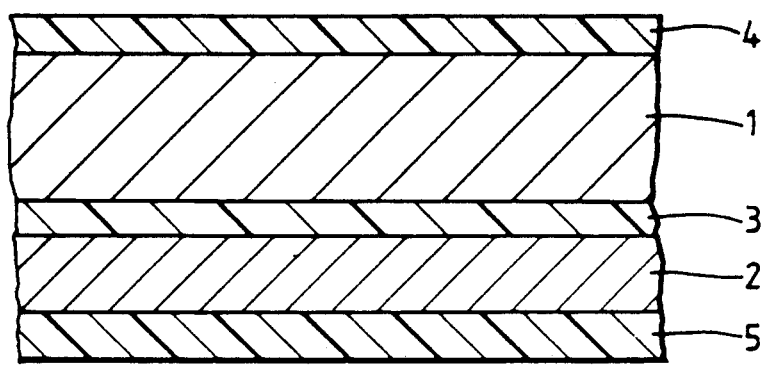

CARTON BLANK, ESPECIALLY FOR USE IN CONTAINERS FOR FOOD PRODUCTS

The invention relates to a carton blank, especially for use in containers for food products, with the container comprising a basic body of paperboard which is coated or laminated with polyolefins.

Containers of carboard or paperboard are increasingly used for storage and sale of food products, e.g. fruit juices, jam, or various kinds of convenience food. It is common to such products that a tight packaging is important and that the packaging should not only be tight as regards leakage of its content, but it should also form a gas barrier so that the content of the packaging is stored in such a manner that influence from the surroundings is minimized.

In the course of time a large variety of carton packagings were developed to satisfy the above mentioned requirements. The most common manner of making a paperboard container gas-tight is by laminating an aluminum layer onto the paperboard, however, this is a relatively sensitive and complicated process if a satsifactory product is to be achieved, and at the same time production costs will be relatively high. Another disadvantage of containers made from paperboard which is coated with aluminum is that aluminum is a quite rigid and not very flexible material so that cracks may easily form when the paperboard is folded and such cracks will, in turn, inevitably cause gas passage.

Manufacture of other kinds of paperboard laminates was also suggested to achieve the same gas barrier property, and in most cases combinations with layers of polyethylene are used to form the barrier layer. Examples of such paperboard laminates are found in DE-OS 25 30 477, and European Patent Application 0138612. In the last mentioned publication the intention is also to provide a barrier against leakage of oil and fat from the content of the container. In NO-PS No. 139 293 a paperboard laminate is disclosed where oxygen tight layers of vinylidene chloride polymer are used in addition to a polyethylene layer on the paperboard. In the Swedish laid open patent application No. 301 289 a further laminated carton material has been described. This material is based on a thicker paper- or carton basic layer which is laminated to a thinner plastic coated paper sheet by means of thermoplastic. The material is then coated with plastic layers on both surfaces. In this Swedish publication it is, however, described a material with perforated areas but there has not been described any precaution to make it gas proof.

In spite of the products mentioned in the above publications, utilization of aluminum layers is still the most commonly used method in production of a paperboard container which is tight as regards gas permeability as well as leakage of fat or liquid.

It is, thus, an object of the invention to provide a carton blank intended for production of containers, which should have improved properties as compared to previously known containers, especially a paperboard packaging with an aluminum layer laminated to the paperboard. It is a more specific object of the invention to provide a paperboard packaging showing good impermebililty to gas, i.e. securing gas penetration of less than 300 cm$^3$ gas per m$^2$ during a period of 24 hours at 23° C., as measured by the aid of a gas flowmeter (Mocon-Oxtran). A value in the range of 1 to 10 cm$^3$ per m$^2$ per 24 hours would be preferred. Furthermore, a carton blank should be provided which, when used for containers, should not be liable to fracture or show crack phenomena which might puncture the gas tight layer.

Another object of the invention is to provide a carton which is permeable to microwaves, which an aluminum coated paperboard is not. Also, a carton should be provided which is less expensive in production than previously known cartons. Said objects are achieved by a carton blank of the above mentioned kind which is characterized by the features stated in the claims.

A carton blank, according to the invention is based on a paperboard which is laminated with a greaseproof paper, i.e. a paper of the sandwich paper or parchment paper kind, the lamination or adhesion between said two layers being provided by a glueing layer, for instance of polyolefins or equivalent components. In manufacturing a container the paperboard surface should face outwards with the greaseproof paper facing inwards. Both external surfaces are coated with an adhesive layer, such as a polyolefin layer. As indicated above, the expression greaseproof is intended to comprise all kinds of grease-resistant paper made from chemical pulp with grease resistence being achieved by a high degree of beating. Glassines are, thus, also included. The defination of adhesives such as polyolefins should generally cover polymers of unsaturated aliphatic hydrocarbons and polymers related with them. At present polyethylene and, e.g. polypropene, are of most interest. Combinations of adhesives are also possible. Separately, polyethylene and greaseproof paper show relatively low gas tightness,. but the combination of such materials in a laminate proved to provide very good impermeability to gas. So as to achieve a desired degree of gas impermeability the quality of the greaseproof paper, i.e. the degree of beating of the cellulose fibers in the paper, will be decisive. This permits an adjustment of the impermeability to gas of the carton blank according to requirements and desires.

The greaseproof paper has an inherent rigidity which permits utilization of thinner paperboard than commonly used in a laminate of paperboard and aluminum. It will, thus, be possible to manufacture a laminate or a carton blank the cost of which is lower than the cost of a conventional paperboard/ aluminum laminate having the same properties as regards gas tightness and rigidity. The combination of greaseproof paper and paperboard laminated by the aid of adhesives such as polyolefins proved to result in a carton blank which tolerates bending without any of the layers cracking. A blank is, thus, achieved in which the problems prevailing in case of an aluminum coated paperboard are avoided, also as mentioned above fractures that may occur in the latter when the carton blank is bent or folded into a container.

As mentioned above, adjustment of the gas impermeability will depend on the degree of beating of the greaseproof paper, a high degree of beating will, thus, result in good gas impermeability, whereas a lower degree of beating will result in poor impermeability. For lamination of the paperboard, however, adhesion is also very important and this must be taken into consideration when the greaseproof paper quality is selected. A low degree of beating of the fibers in the paper will provide good adhesion, on the other hand, it will result in poor gas tightness and it will be necessary to aim at an optimization.

It may also be mentioned that greaseproof paper has good barrier qualities against fat, and is also used, e.g. as an insert in cartons for biscuits and the like. In the present context, the greaseproof paper is, however, not intended for providing an oxygen barrier, it should only prevent penetration of fat.

Further it should be noted that greaseproof paper is brittle and easily may tear when folded. In the laminated form according to the present embodiment it has, however, not been registered any such disadvantage. In contrary the use of greaseproof paper has proved to give a better rigidity and strength to the complete laminate. This is a very surprising effect.

Below, the invention is illustrated in the FIGURE in more detail with reference to an embodiment, and it is referred to a diagrammatical cross section illustrating the build-up of layers in a carton blank according to the invention.

A carton blank intended for use in production of containers for fruit juice is based on a basic member built up from paperboard 1 with a thickness corresponding to a specific weight of 100–500 g/m$^2$, which is laminated by the aid of a polyolefin layer 3, which in this special embodiment is selected with a thickness corresponding to a specific weight of 8–50 g/m$^2$, with a greaseproof paper 2 having a thickness corresponding to a specific weight of 25–100 g/m$^2$. Said basic member comprising said three layers 1, 2 and 3, is on the surface which is intended to form the outer face of the container coated with a polyethylene layer 4 with a thickness of the coating corresponding to a specific weight of 8–40 g/m$^2$ of the layer. On the inner surface a polyethylene layer 5 with a thickness corresponding to 10–50 g/m$^2$ is laminated. The polyethylene coatings may have dye pigment added. The degree of dyeing the polyethylene will depend on the product which is to be protected and on its light sensitivity. The greaseproof paper is manufactured from sulphate cellulose, it has low air permeability and has a fat barrier exceeding 900 sec. TAPPI, e.g. 1600 sec. which is a value describing, inter alia the degree of beating. For the utilizations intended today said value is a very suitable mean value.

As is known in the art, TAPPI is an abbreviation for the Technical Association of Pulp and Paper Industry, and the reference is to their test for air permeability and fat barrier, in greaseproof paper.

A carton blank showing the above mentioned average values was used in experimental container production and showed very good results, with the container being without fissures after folding operations.

In order to illustrate the advantange of the invention better, and thus the benefits achieved by the special composition of the laminate, there has been made comparative tests with two laminate blanks, one blank sample comprising a layer of unbleached, uncalandered Kraft paper and one blank sample comprising a layer of greaseproof paper according to the invention. Prior to the invention the unbleached, uncalandered Kraft paper would have been the normal selection by the composition of a laminate.

The following layers were used in the laminated samples. The thickness of the respective layer is given through the density. The term LDPE means Light density polyethylene.

|  | Sample 1 Density (g/m$^2$) | Sample 2 Density (g/m$^2$) |
| --- | --- | --- |
| LDPE | 14 | 14 |
| Duplex paperboard | 224 | 224 |
| LDPE | 20 | 20 |

|  | Sample 1 Density (g/m$^2$) | Sample 2 Density (g/m$^2$) |
| --- | --- | --- |
| Unbleached, uncalandered Kraft paper | 70 | — |
| Greaseproof paper | — | 50 |
| LDPE | 40 | 40 |

The samples were mounted in Al-boxes with a diameter of 70 mm in order to seal raw edges. Test conditions: Room temperature 23° C. Dry oxygen against the outside surface; the carrier gas, nitrogen, must be moistened due to the sensors of the measuring apparatus (Oxtran-apparatus). The following results were achieved with respect to gas passage.

| Sample 1 | | |
| --- | --- | --- |
| test a | 842,8 | cm$^3$/m$^2$, 24 h, 1 atm. |
| test b | 752,6 | cm$^3$/m$^2$, 24 h, 1 atm. |
| Sample 2 | | |
| test a | 1,7 | cm$^3$/m$^2$, 24 h, 1 atm. |
| test b | 2,47 | cm$^3$/m$^2$, 24 h, 1 atm. |

The measurement values for sample 2 are very low and the material can be compared with Al-foil-laminated carton with respect to being gas proof. Al-foils used in containers for liquid will be extremly thin (7–9 m) and disclose pinholes having influence on the oxygen barrier effect. The test results are stating clearly that a carton blank according to the invention will be a very effective gas barrier.

In order to illustrate the effect of the invention further, and thereby demonstrate that an unexpected synergy effect has been achieved, the above results may be compared with the barrier contribution of the individual layers which are as follows:

paperboard : >100 000 cm$^3$/m$^2$ 24 h/1 atm.
greaseproof: >100 000 cm$^3$/m$^2$ 24 h/1 atm.
LDPE: ca. 3 000 cm3/m$^2$ 24 h/1 atm. (at 50 g/m$^2$)
Milkboard which consists of paperboard and 14, resp. 26 g/m$^2$ polyethylene has a measured transmission rate of 1100 cm$^3$/m$^2$ 24 h/1 atm. The added synergy effect from greaseproof is overwhelming.

The essential feature of the carton blank according to the invention is, thus, its build-up in the form of a laminate consisting of a combination of paperboard and greaseproof paper which is laminated and coated on both sides by the aid of an adhesive. At the moment a polyolefin is preferred. Many modifications are possible within the scope of the invention both as regards the quality of paperboard and the quality of greaseproof paper and, at the same time it is possible to use different thicknesses for different layers, and if desired further addititives to certain layers to make the carton blank especially suited for special products. Even though it was mentioned that the carton blank is especially intended for use in containers for food products there are, obviously, many other possible utilizations within the scope of the invention. As mentioned above, the carton blank will not prevent penetration by microwave radiation, which opens up great possibilities for microwave heating both of food products and other materials. A carton blank according to the invention may, thus, find use for storage of a wide range of products, its essential strength being the gas barrier properties which may be varied to a certain degree by the aid of the composition of materials of the blank, and also due to the good possibilities of shaping the blank without fissures or cracks occuring in the gas tight layer. The carton blank is, thus, useful for storing a series of products which are compatible with polyethylene, but which must be maintained in an oxygen free atmosphere.

We claim:
1. A carton blank comprising:
   (a) a paperboard member;
   (b) a layer of greaseproof paper laminated to said paperboard member by means of a layer of adhesive, to form a paperboard/greaseproof paper composite having first and second, opposite, sides;
      (i) said greaseproof paper having a grease-resistance of at least 900 sec. according to the standard of the Technical Association of Pulp and Paper Industry;
   (c) a first layer of polyethylene laminated to the paperboard/greaseproof paper composite first side;
   (d) a second layer of polyethylene laminated to the paperboard/greaseproof paper composite second side; and,
   (e) said carton blank being further characterized by the absence of a metal foil sheet therein.
2. A carton blank as defined in claim 1 wherein the paperboard layer is provided towards the side which is to form the outside of the container.
3. A carton blank according to claim 1 wherein said greaseproof paper has a grease resistance of about 900–1600 sec.
4. A carton blank according to claim 3 wherein said adhesive is a polyolefin adhesive.
5. A carton blank according to claim 4 wherein said adhesive is a polyolein adhesive selected from the group consisting of polyethylene adhesives, polypropylene adhesives and mixtures thereof.
6. A carton blank according to claim 1 wherein:
   (a) said firs layer of polyethylene has a thickness in a range corresponding to a specific weight of about 8–50 g/m$^2$;
   (b) said second layer of polyethylene has a thickness in a range corresponding to a specific weight of about 8–50 g/m$^2$; and,
   (c) said layer of adhesive between said paperboard member and said greaseproof paper has a thickness corresponding to a weight of about 8–50 g/m$^2$.
7. A carton blank according to claim 6 wherein said greaseproof paper has a thickness corresponding to a specific weight of about 25–100 g/m$^2$.
8. A carton blank according to claim 7 wherein said paperboard member has a specific weight of about 100–500 g/m$^2$.
9. A carton blank according to claim 1 wherein said greaseproof paper has a thickness corresponding to a specific weight of about 25–100 g/m$^2$.
10. A carton blank according to claim 9 wherein said paperboard member has a specific weight of about 100–500 g/m$^2$.
11. A carton blank comprising:
    (a) a paperboard member; said paperboard member having a specific weight of about 100–500 g/m$^2$;
    (b) a layer of greaseproof paper laminated to said paperboard member by means of a layer of adhesive, to form a paperboard/greaseproof paper composite having a first and second, opposite sides;
       (i) said greaseproof paper having a grease resistance of about 900–1600 sec. according to the standard of the Technical Association of Pulp and Paper Industry;
       (ii) said greaseproof paper having a thickness corresponding to a specific weight of about 25–100 g/m$^2$;
    (c) a first layer of polyethylene laminated to the paperboard/greaseproof paper composite first side; said first layer of polyethylene having a thickness in a range corresponding to a specific weight of about 8–50 g/m$^2$;
    (d) a second layer of polythylene laminated to the paperboard/greaseproof paper composite second side; said second layer of polyethylene having a thickness in a range corresponding to a specific weight of about 8–50 g/m$^2$; and,
    (e) said carton blank being further characterized by the absence of a metal foil sheet therein.
12. A carton blank according to claim 11 wherein said layer of adhesive between said paperboard member and said greaseproof paper has a thickness corresponding to a weight of about 8–50 g/m$_2$.

* * * * *

UNITED STATES PATENT AND TRADEMARK OFFICE
CERTIFICATE OF CORRECTION

PATENT NO. :     5,057,359

DATED      :     October 15, 1991

INVENTOR(S) :    Knut Merdem et al.

It is certified that error appears in the above-identified patent and that said Letters Patent is hereby corrected as shown below:

Column 5, line 36 "polyolein" should read --polyolefin--.

Signed and Sealed this

Fourteenth Day of September, 1993

Attest:

BRUCE LEHMAN

Attesting Officer      Commissioner of Patents and Trademarks